United States Patent [19]

Sattinger

[11] 4,089,535
[45] May 16, 1978

[54] DUAL-SHANK ATTACHMENT DESIGN FOR OMEGA SEALS

[75] Inventor: Stanley S. Sattinger, Pittsburgh, Pa.

[73] Assignee: The United States of America as represented by the United States Department of Energy, Washington, D.C.

[21] Appl. No.: 762,365

[22] Filed: Jan. 25, 1977

[51] Int. Cl.² .............................................. F16J 15/08
[52] U.S. Cl. .................................... 277/236; 285/286
[58] Field of Search ................. 285/286, 18; 277/236

[56] References Cited

U.S. PATENT DOCUMENTS

| | | | |
|---|---|---|---|
| 2,352,038 | 6/1944 | Tòlke | 285/286 |
| 2,792,241 | 5/1957 | Bondley et al. | 285/286 |
| 3,204,971 | 9/1965 | Meriano | 285/DIG. 18 |
| 3,311,392 | 3/1967 | Buschow | 277/236 |
| 3,817,805 | 6/1974 | Surikou et al. | 285/286 |
| 3,929,253 | 12/1975 | Johnsson | 277/236 |

*Primary Examiner*—Robert I. Smith
*Attorney, Agent, or Firm*—Dean E. Carlson; Kenneth L. Cage; Jack Q. Lever

[57] ABSTRACT

An improved apparatus and process for attaching welded omega seal segments to reactor heads, standpipes, mechanisms, and plugs comprises a first shank in combination with a second shank to attach an omega seal at a metal-to-metal interface.

8 Claims, 10 Drawing Figures

DUAL-SHANK ATTACHMENT DESIGN FOR OMEGA SEALS

BACKGROUND OF THE INVENTION

The invention described herein was made in the course of, or under, a contract with the United States Energy Research and Development Administration.

FIELD OF THE INVENTION

This invention relates to omega seals. More particularly, this invention relates to toroidal omega seals which form flexible fluid pressure boundaries at metal-to-metal interfaces and the process of attachment welding such seals. The seals of this invention are particularly well adapted to form fluid pressure boundaries at reactor head penetrations or standpipes.

DESCRIPTION OF THE PRIOR ART

Current practice is to attach omega seal halves to their respective foundations or support structures by welding, which enables the seals to be premachined into toroidal configuration before attachment and to be replaced if necessary in the event of damage. For example, as depicted in FIGS. 1a and 1b a mechanism omega seal comprises an outboard seal half 10 and inboard seal half 12. The outer half is attachment welded to the head or standpipe 14, and the inner half 12 is attachment welded to the mechanism motor tube 16.

Prior art attachment designs currently in use are the long-shank 18 and short-shank 20 designs as respectively shown in FIGS. 1a and 1b. Each design 18 and 20 utilizes a weld attachment of only a first shank 21. After attachment welds 22 of the seal halves are complete, a seal weld joint preparation groove 24 is machined into the crown 26 of each half as shown in FIG. 1. Upon final assembly, this joint is seal welded, forming a complete pressure boundary. To allow subsequent temporary removal of the mechanism or other component, this weld joint must be cut, reprepared and rewelded.

Incumbent in this prior art method are distortions in both the radial and vertical directions which occur during the attachment welding of the seal halves to their foundations. Circumferential variations result in "wobble", which, in turn, causes irregularities in the final-machined seal weld preparation as shown in FIGS. 2a and 2b. As illustrated in FIGS. 2a and 2b, variations 28 in the amount of vertical shrinkage and variations 30 in the amount of radial shrinkage and rotation around the circumference (from location 12 to location 12') result in irregularities in preparation cross section when the uniform preparation machining is performed. These irregularities lead to problems in producing seal welds of the required degree of integrity owing to the large accompanying variations in heat absorption patterns. The "wobble" producing these irregularities is especially pronounced in the case of short-shank attachment.

An additional problem is the large inward radial shrinkages of the outer seal half due to seal welding, notably in the long-shank omega seal 10 (FIG. 1a). These large radial shrinkages limit the ability of a seal weld to be cut and rewelded. For example, referring to FIGS. 3a, 3b and 3c, the variation in radial positions of the outer seal 10 through several rewelds is illustrated in relation to the constant-diameter seal weld preparation 24. With each successive reweld, the radial shrinkage results in added detrimental imbalance of the preparation cross-section areas. The original lip diameters of the seal weld preparation 24 must be maintained for each successive cut. It has been shown that the flexibility of the long attachment shank contributes markedly to this shrinkage. A long-shank attachment weld is illustrated in U.S. Pat. No. 2,792,241 issued to R. J. Bondley et al. on May 14, 1957.

SUMMARY OF THE INVENTION

Accordingly, it is a primary object of this invention to provide an improved design for omega seal segments.

It is a further object of this invention to provide a design for attaching omega seals which reduces the distortions in both the radial and vertical directions in response to attachment welding.

A still further object of this invention is to control inward radial shrinkage of the outer half of the omega seal in response to seal welding.

Yet, another object of this invention is to provide an improved method for attaching omega seal segments in a metal-to-metal interface.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the omega seal structure of this invention comprises an omega seal structure comprising a pair of arc shaped spaced-apart members, each of the members oriented to each other to form approximately one-half of an omega seal and having one end disposed for welding at the apex thereof, each of the members including a first extended shank attachment at the second end respectively disposed for welding to respective first and second support structures and at least one of the members having a second shank attachment disposed from 45° to 135° to the first shank suitable for welding at the second end to one of said support structures.

Preferably the second shank is disposed at 90° to the first shank.

It is also preferred that an omega seal structure segment comprises an arc shaped member, the member defining a first apex end and a second end, a first extending shank welding attachment to the second end, and a second shank welding attachment attached to the second member end, the second shank disposed from 45° to 135° with respect to the first shank.

The preferred method of attaching omega seal segments to spaced-apart first and second structures to form an omega seal, the omega segments having a pair of arc shaped spaced-apart members, each of the members oriented to each other to form approximately one-half of an omega seal and having one end disposed for welding at the apex thereof, each of the members including a first extended shank welding attachment, and a second shank welding attachment disposed from 45° to 135° to the first shank, consists of (1) welding each of said first shank segment attachments to the respective first and second support structures; (2) welding the second shank segment attachment to the respective first and second support structures; (3) machining a seal weld joint preparation groove at the apex of the segments; and (4) welding each segment together at the apex groove to form a closed omega seal.

BRIEF DESCRIPTION OF THE DRAWINGS

The invention consists in novel parts, constructions, arrangements, combinations and improvements shown and described. The accompanying drawings, which are incorporated in and constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1A:
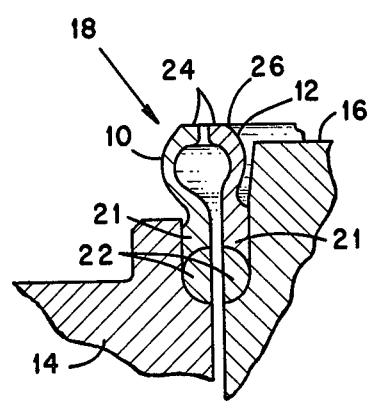
FIGS. 1a and 1b are currently used prior art means of attaching omega seals for long-shank and short-shank seals respectively.
Figure 1B:
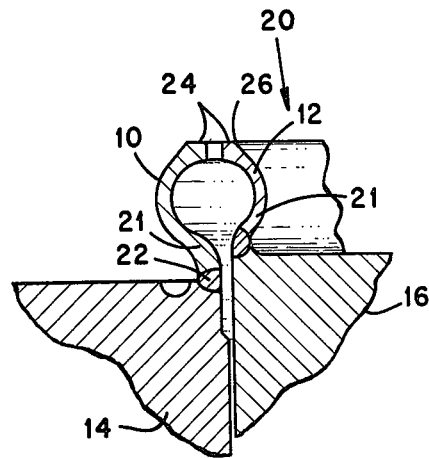
Figure 2A:
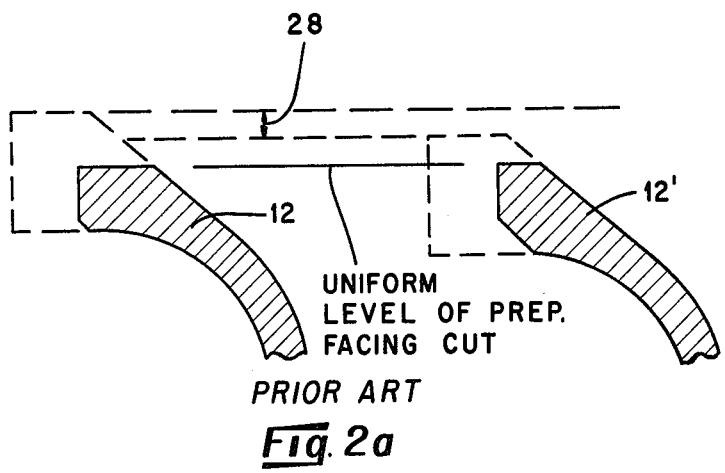
FIGS. 2a and 2b illustrate the prior art irregularities in seal welf preparation cross section due to circumferential variations in vertical shrinkage and radial shrinkage, respectively, sustained in attachment welding.
Figure 2B:
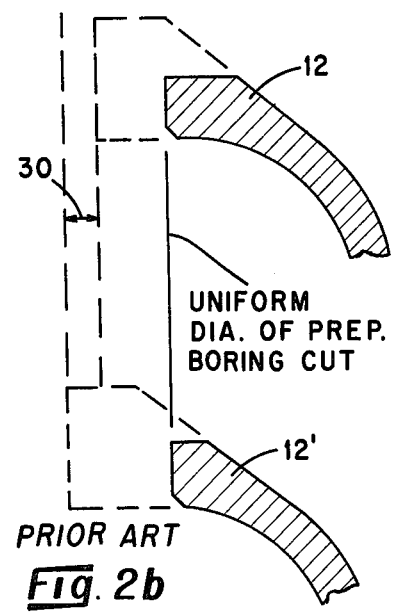
Figure 3A:
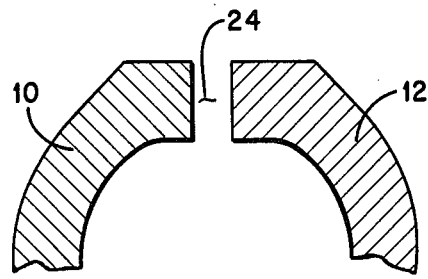
FIGS. 3a, 3b and 3c show the prior art configuration before the first weld, before the second weld, and before the fourth weld respectively which illustrate the cut-reweld limitation due to seal-welding-induced radial shrinkage of an outer seal.
Figure 3B:
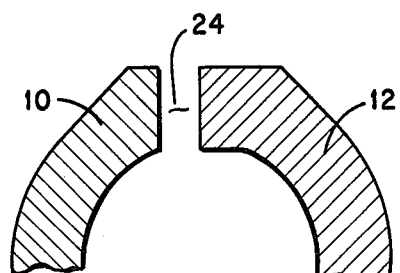
Figure 3C:
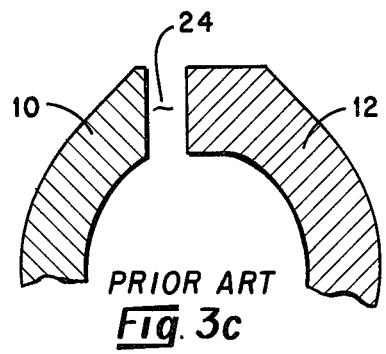
Figure 4:
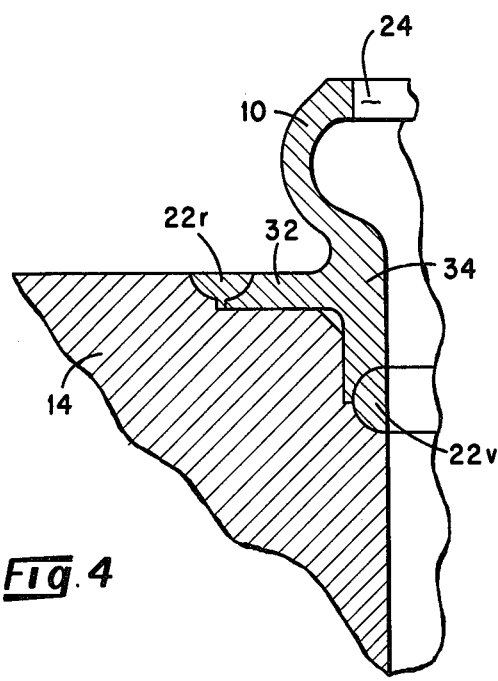
FIG. 4 illustrates the present invention of a dual-shank attachment design for an outer omega seal half.
Figure 5A:
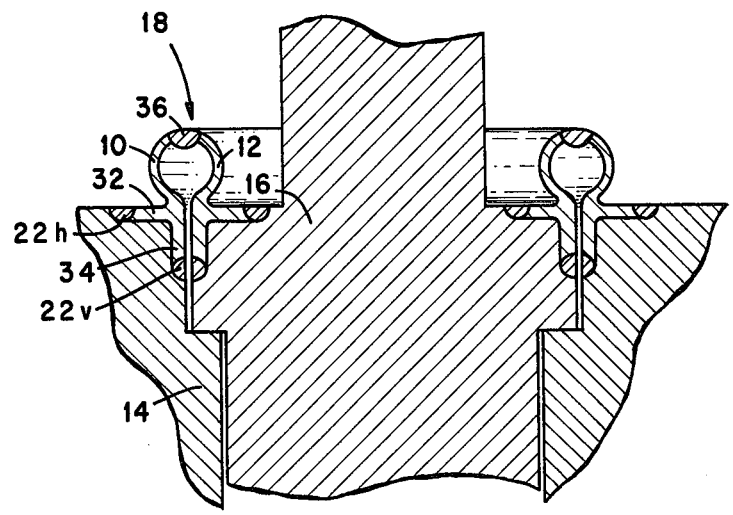
FIGS. 5a and 5b are vertical interfaces and horizontal interfaces using dual-shank attachment for omega seals.
Figure 5B:
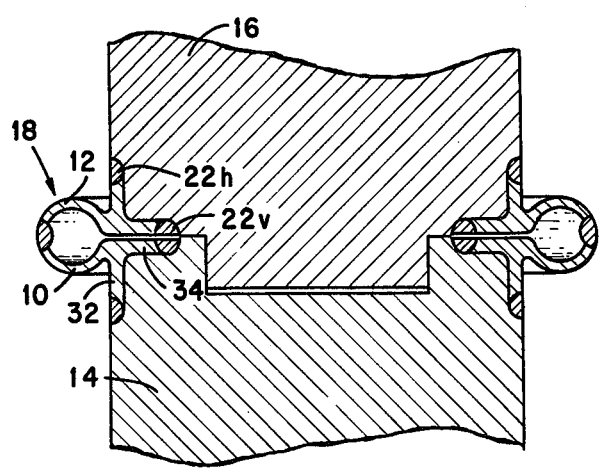

Referring now to the drawings, FIG. 4 and FIG. 5 show the arc shaped omega seal segment of the present invention which uses a second shank 32 in combination with the first shank 34 and features an attachment weld 22 at each end thereof.

In accordance with the invention, the first and second shanks 32 and 34 act in combination to limit attachment welding distortions. The second shank is disposed from 45° to 135° to the first shank. In this manner, the tendency of each of the attachment welds 22 to shrink in the width direction pulls each attachment shank in contact to a first support structure surface for support. For instance, as the first attachment weld 22 cools, it tends to draw the seal downward, pulling the second shank 32 against the foundation surface. This contact, in turn, restrains the completed seal from displacing vertically. The horizontal shank has the additional function of restraining the radial shrinkage of the seal due to the subsequent seal welding operations.

Preferably shanks 32 and 34 are oriented in respective horizontal and vertical directions, or alternatively at right angles to one another. It is also apparent that shanks may be spaced at angles ranging from 45° to 135° to each other with one in a horizontal or vertical plane and this spacing of the shanks is equally effective in reducing welding distortions. Preferably, each of the horizontal shanks may be of equal length to the length of the vertical shanks. In addition, the horizontal shank thickness can be less than the vertical shank thickness, but greater than the wall thickness of the omega seal portion. In this manner, the radial distortions and shrinkages are minimized.

As here embodied, the seal is machined integrally with its attachment shanks from a forged ring, using vacuum-melted material for high seal integrity. Although the present invention is illustrated only in an outer seal application, it is equally applicable to inner seal halves as well. The concept need not be restricted to seals which bridge a vertical interface as in the case of mechanism seals, but could also be applied in instances where the sealed interface is horizontal as in the case of position indicator coil housing-to-motor tube seals in nuclear reactors.

In accordance with the invention, the pair of omega seal segments having the apex of each point towards one another form an omega seal structure. In FIGS. 5a and b welds 22h and 22v at each shank and apex weld 36 form the completed omega seal between first and second spaced-apart support structures 14 and 16. In accordance with the invention, the method of attaching the omega seal to the spaced-apart structures consists of welding each of the first shank segments to each respective first and second support structures, welding each of the second shank segment attachments to the respective first and second support structure, machining a seal weld joint preparation groove 36 at the apex of the segments, and welding each segment together at the apex to form a closed omega seal. One of the dual shank segments may also be used in combination with a single shank segment where space limitations preclude the disposal of the second shank.

According to the present invention, an attachment weld distortion is maintained of only 0.008 ± 0.002 inch vertical shrinkages as measured around the circumference of dual shank mechanism outer seals. This tolerance is in marked contrast with shrinkages as large as 0.052 ± 0.007 inch obtained with a short-shank outer seal and 0.083 ± 0.016 inch obtained with long-shank outer seals. The average radial shrinkage due to seal welding was 0.031 inch for the dual-shank outer seal as compared to 0.038 inch for a long-shank seal of the same geometry.

As here embodied, the dual-shank seals with integral shanks and attachment weld preparations are machined using standard practices. There is adequate space between adjacent mechanism seals in most reactor designs to accommodate attachment welding and weld repair operations on adjacent horizontal shanks.

The subsequent servicing operations of seal welding, seal weld cutting, and seal weld repreparation will be facilitated by the reduced seal welding distortions. The outer attachment weld can be interrupted as necessary to accommodate holddown studs adjacent to the seal.

From a stress viewpoint, the dual-shank seal is nearly the same as an integrally attached seal in response to foundation displacements and pressurization loading. The dual-shank design is superior both to the short-shank and the long-shank attachment seal designs in that the latter designs sustain parasitic bending stresses due to pressurization. These stresses occur owing to the radial flexibility of the stilted shanks, which displace under pressurization and induce bending in the seal toroids. Further, the dual-shank seal attachment design exhibits a width shrinkage tendency pursuant to the attachment welds such that the shanks are pulled into supporting contact with their mating foundation surfaces. The shrinkage obtained in welding is thus used to advantage in this instance rather than endured as a usual welding hindrance.

The invention provides a design for omega seal segments, an omega seal structure that reduces the welding distortion in radial and vertical directions, controls inward radial shrinkage, and provides an improved method for attaching omega seal segments in a metal-to-metal interface.

Thus, it is apparent that there has been provided in accordance with the invention a dual-shank attachment omega seal that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

I claim:

1. An omega seal structure comprising a pair of arc shaped spaced-apart members, each of said members oriented to each other to form approximately one-half of an omega seal and having one end disposed for welding at the apex thereof, each of said members including a first extended shank attachment at the second end respectively disposed for welding to respective first and second support structures, and at least one of said members having a second shank attachment disposed from 45° to 135° to said first shank suitable for welding at the second end to one of said support structures.

2. The structure defined in claim 1, wherein said second shank is disposed at 90° to said first shank.

3. The structure defined in claim 1, wherein said first shank is vertically oriented and said second shank is horizontally oriented.

4. The structure defined in claim 1, wherein each of said members has a second shank disposed from 45° to 135° to said first shank.

5. The structure defined in claim 4, wherein each of said second shanks is diametrically disposed to one another.

6. The structure defined in claim 4, wherein each of said second shanks is of equal length to the length of said vertical shanks.

7. The structure defined in claim 4, wherein said each of said second shanks has a thickness which is less than said vertical shank thickness, but greater than the wall thickness of said omega seal portion.

8. An omega seal structure segment comprising an arc shaped member of approximately one-half of an omega seal structure, said segment defining a first apex end and a second end, a first extending shank welding attachment to said second end and a second shank welding attachment attached to said second member end, said second shank disposed from 45° to 135° with respect to said first shank.

* * * * *